UNITED STATES PATENT OFFICE.

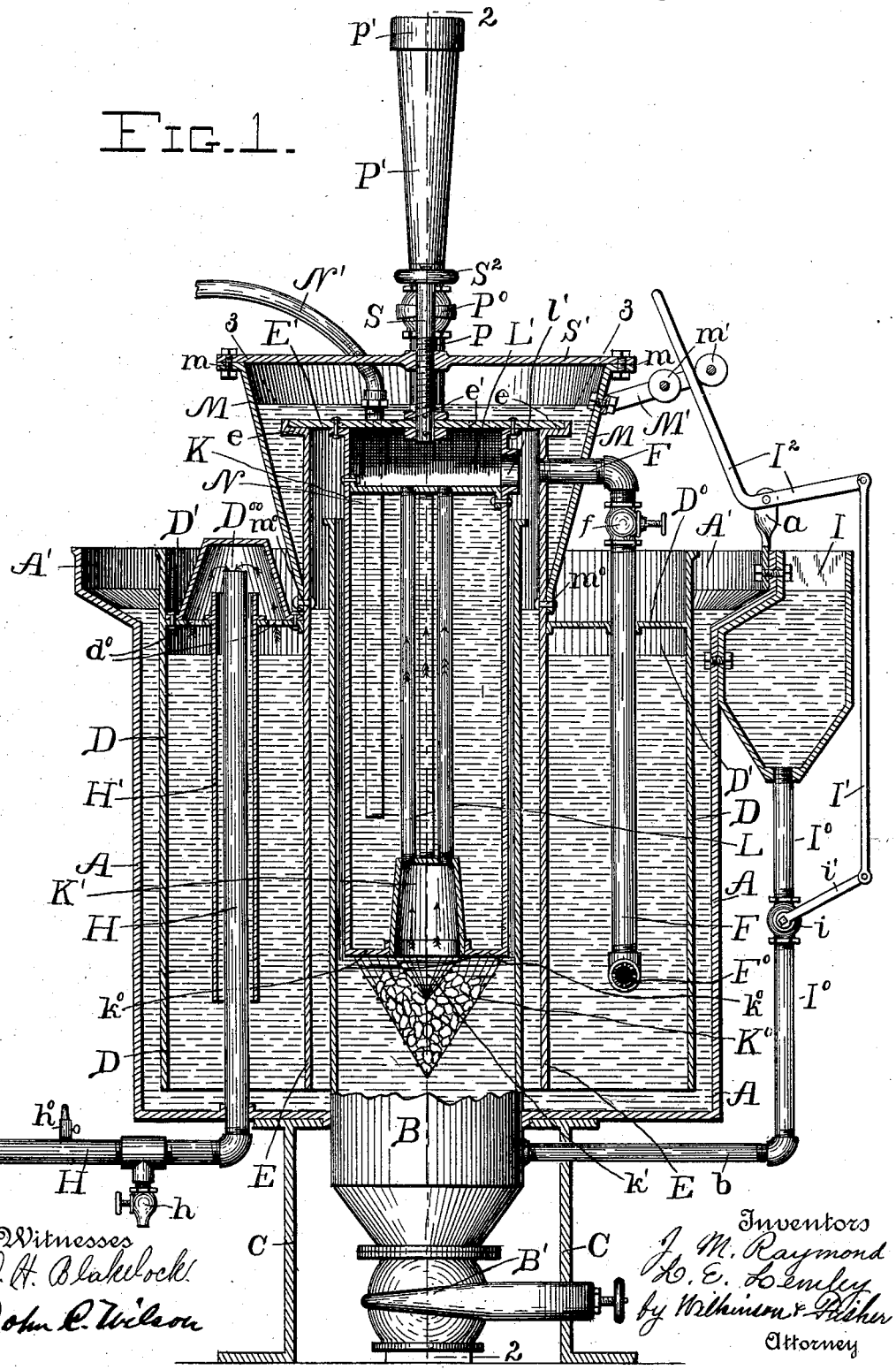

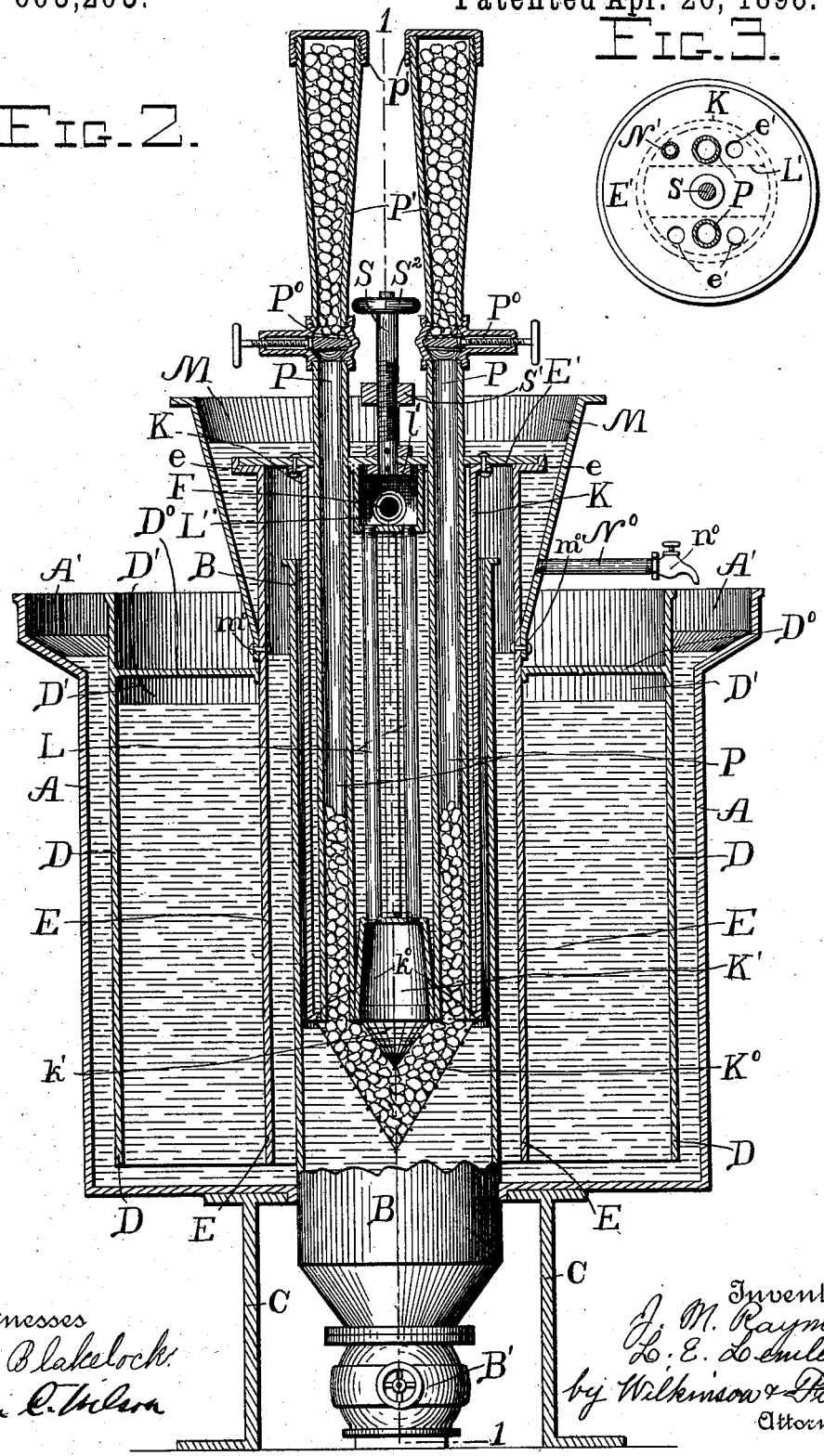

JOHN MORTIMER RAYMOND AND LOUIS EDWARD LEMLEY, OF NEW ORLEANS, LOUISIANA, ASSIGNORS OF ONE-THIRD TO WILLIAM THOMAS COATS, OF SAME PLACE.

ACETYLENE-GAS GENERATOR.

SPECIFICATION forming part of Letters Patent No. 603,205, dated April 26, 1898.

Application filed September 28, 1897. Serial No. 653,360. (No model.)

*To all whom it may concern:*

Be it known that we, JOHN MORTIMER RAYMOND and LOUIS EDWARD LEMLEY, citizens of the United States, residing at New Orleans, in the parish of Orleans and State of Louisiana, have invented certain new and useful Improvements in Acetylene-Gas Generators; and we do hereby declare the following to be a full, clear, and exact description of the invention, such as will enable others skilled in the art to which it appertains to make and use the same.

Our invention relates to improvements in apparatus for generating and storing gas created by the chemical action of a liquid upon a solid material, such as water and calcium carbid, which produces acetylene gas.

Our invention has for its object to provide an improved generator of the gasometer variety, either portable or stationary; and it consists in the novel apparatus hereinafter described and claimed.

Reference is had to the accompanying drawings, wherein the same parts are indicated by the same letters throughout the several views.

Figure 1 represents a central vertical section through our apparatus on the line 1 1 in Fig. 2 and looking to the left, with some of the parts shown in elevation. Fig. 2 represents a similar section taken on the line 2 2 in Fig. 1 and looking to the left; and Fig. 3 represents a horizontal section taken on the line 3 3 in Fig. 1, showing the cover E' of the carbid-cylinder in plan.

A represents an outer tank provided with an enlarged top A'. The bottom of this outer tank A is provided with a central opening for the passage of the cylinder B, which fits closely in said opening. This enlarged upper portion of the tank forms an overflow-ring for the surplus water from the gasometer, as will be hereinafter more fully described.

The tank A is mounted upon any suitable supports, such as legs C. (Shown in Figs. 1 and 2.)

Within the tank A is mounted a larger cylinder D and a smaller concentric cylinder E, both of which surround the cylinder B, above referred to. The former is open at its bottom and near its top closed by means of a head $D^0$, which is provided with a central opening therethrough for the passage of the said smaller cylinder E and other openings for the inlet and outlet pipes of the gasometer F and H, respectively, as shown in Fig. 1. The smaller cylinder E is fixed in the head $D^0$ of the larger cylinder or gasometer D, and at their lower ends the two cylinders are even, so that both may rest upon the bottom of the outer tank A; but the upper end of the inner cylinder E extends some distance above the outer cylinder D.

The pipe F, supplying the gas from the generator-cylinder E to the gasometer, is fitted closely or fixed in the opening therefor through the head $D^0$ of the gasometer, as is also the outer surrounding casing H' of the outlet or service pipe H from the gasometer, which casing H' moves upward and downward over the pipe H as the gasometer-cylinder D rises and falls.

A cap $D^{00}$ is closely fitted upon the head $D^0$ of the cylinder D, over the upper ends of the service-pipe H and its surrounding casing H', and the head $D^0$, beneath said cap and around said pipe and casing, is provided with perforations $d^0$ for the passage of the gas from the gasometer D into the service-pipe H, as shown in Fig. 1, the direction of the passage of the gas being indicated by the arrows.

Around the upper end of the cylinder E is closely fitted a flaring collar M, the lower edge of which is secured to the said cylinder E by means of rivets $m^0$ immediately above the head $D^0$ of the gasometer. A carbid-cylinder K extends downwardly into the cylinder D and is provided with a closely-fitting cover or head E', which extends over the upper end of the cylinder E, the latter being provided with a flanged rim, within which the cover E' fits closely. The weight of the cylinder K will tend to hold the head E' upon the cylinder E, but is assisted by the screw S, which passes through a cross-piece S', bolted at the ends, as at m m, to the upper edge of the flaring collar M, as seen in Fig. 1.

A hand-wheel $S^2$ is provided for turning the screw, and by means of this screw, the lower end of which is so connected to the head E' as to allow of its being turned, the said head, and with it the whole cylinder K, may be raised or lowered at will by the simple turning of the hand-wheel S².

Within the upper portion of the cylinder K is formed a rectangular chamber L, having an outlet $l'$ opposite the upper end of the pipe F, which enters the side of the cylinder E near its upper end, as seen in Fig. 1. The head E' is provided with a plurality of openings $e'$, as shown in Fig. 3 and further indicated in dotted lines in Fig. 1, which allow access of water to the interior of the cylinder K, which is provided with a closed bottom $k^0$. A pipe N is also fitted with the head E' and extends downwardly into the cylinder K, and may have a flexible tube N' connected to its upper end, as shown in Fig. 1, to be used as a siphon to discharge water from said cylinder K.

In the bottom $K^0$ of the cylinder K is an inverted hollow chamber K', which projects upwardly into said cylinder, and connection is established between this chamber K' and the chamber L' in the upper part of the cylinder by means of a plurality of vertical pipes L, which pass upward through the said cylinder.

Beneath the bottom of the cylinder K a conical wire basket $K^0$ is suspended for the reception of the carbid, which is introduced into said basket through pipes P, which are fitted through the head E' and extend through the interior of said cylinder and through the bottom $k^0$, where they open above the carbid-basket $K^0$, as seen in Fig. 2. The upper ends of these pipes P P, which extend above the head E', are fitted with valves P⁰ P⁰, above which valves are mounted funnel-shaped receptacles P', into which a quantity of the carbid may be placed and admitted to the pipes P P through the valves P⁰ P⁰ as needed. The receptacles P' P' are provided with screw-covers $p'$, by means of which they may be kept closed when not being filled.

Above the carbid-basket $K^0$ and inclosing the lower open end of the inverted hollow chamber K' is a second conical wire basket $k'$, the apex of which projects downward into the center of the larger basket $K^0$ and causes the carbid to be distributed around the sides of the larger basket and prevents its piling up in the center thereof, as seen in the drawings.

The gas as it is generated and escapes from the mass of carbid in the basket $K^0$ passes into the chamber K' and thence upward through the pipes L into the chamber L', whence it escapes through the outlet-opening $l'$ into the upper portion of the cylinder E, whence it may pass through the pipe F to the gasometer D, as will be seen from an inspection of Fig. 1. This pipe F, leading from the cylinder E to the gasometer, is provided with a valve $f$, by means of which the said pipe may be closed when desired. The lower end of this inlet-pipe F within the gasometer is connected to a perforated hollow tube $F^0$, from which the gas escapes into the water within the gasometer and rises to the space D' in the upper portion thereof, whence it may escape through the supply-pipe, as hereinafter described.

The outlet or supply pipe H is fitted with a concentric cylinder H', which is rigidly held in the head of the gasometer D, as above described. The lower end of the service-pipe H extends through the bottom of the tank A and is also provided with a petcock $h$ for draining the said pipe, and a burner $h^0$ is also attached to said pipe for the purpose of testing the gas.

The cylinder B is provided at its bottom with a valve B' for cleaning the sediment from said cylinder.

Water is supplied to the cylinder B through a leading-in pipe $b$, connected to a vertical pipe $I^0$, leading from an elevated reservoir I, which may be attached to the outer tank A, as shown in Fig. 1.

The flow of water through the pipe $I^0$ is governed by the valve $i$, to which is connected an arm $i'$, by means of which arm the said valve may be operated either by hand or automatically by the rising and falling of the gasometer through the connections hereinafter described.

A bell-crank lever $I^2$ is pivoted to a support $a$, rigidly mounted upon the rim of the outer tank A, as seen in Fig. 1, and one arm of this bell-crank lever is pivotally connected to a rod I', which in turn is pivotally connected to the valve-arm $i'$, as shown. It will thus be seen that the swinging of the bell-crank lever $I^2$ will open or close the valve $i$, and thus admit water to or shut it off from the cylinder B, into which latter the carbid-basket projects.

A frame M', mounted rigidly upon the flaring collar M, carries a pair of rollers $m'$, mounted a short distance apart therein and parallel, and one arm of the bell-crank lever $I^2$ may be inclosed between said rollers in a slanting position, as shown in Fig. 1, so that as the gasometer rises the said arm will be thrown outward and will cause the valve $i$ to close correspondingly; but as the gasometer falls the said arm will be thrown inward and the said valve will be opened correspondingly, as will be obvious.

Any other devices for automatically operating the lever-arm $I^2$ may be substituted for the frame M' and rollers $m'$, or the said lever may be operated by hand, if desired; but an equivalent arrangement to that shown, whereby the admission of water to the cylinder B is automatically regulated by the rising and falling of the gasometer, is preferred.

The operation of the apparatus is as follows: The calcium carbid or other material from which the gas is to be generated is placed in the receptacles P' and is admitted in sufficient quantities through the valves P⁰ and pipes to the carbid-basket $K^0$. Water is supplied to the cylinder B from the reservoir I through the pipe $I^0$ and the leading-in pipe $b$, the valve $i$ in the former being open when the gasometer is in its lowest position, and thus allowing the passage of the water through said pipe $I^0$. The gasometer should previously have been nearly filled with water, which may be poured into the outer tank A. Water is also poured into the flaring collar M and allowed to run through the openings $e'$ in the head $E'$ to the interior of the cylinder K, where it will surround the various pipes and chambers therein, but will not enter any of these. A drain-pipe $N^0$, having a discharge-cock $n^0$, is mounted in the side of the said flaring collar M for discharging the water therefrom, when desired, into the outer tank A, as shown in Fig. 2. As the water in the cylinder B comes into contact with the carbid in the basket $K^0$, gas will be generated and will rise into the chamber $K'$ and pass upward through the pipes L into the chamber $L'$, whence it will escape into the upper portion of the cylinder E and may pass through the pipe F and perforated pipe $F^0$ into the gasometer, where it will rise to the chamber $D'$ in the upper part thereof. If the gas be confined within the gasometer, the water therein will first be depressed and will rise in the outer tank A; but when the pressure has become sufficient the gasometer itself will rise, and if the gas be not yet allowed to escape will continue to rise as gas is generated until the operation is automatically stopped by water being shut off from the cylinder B and the carbid-basket being also lifted above the water contained in said cylinder, as will be obvious; but if the gas be allowed to pass out through the service-pipe H the gasometer will rise no higher than far enough to relieve the pressure, and the operation will be continuous as long as there is any carbid in the basket $K^0$ and water admitted through the pipe $I^0$.

It will be readily seen that if for any reason it be desired to stop the operation of the gasometer the water may be let out of the cylinder B through the valve $B'$, and the generation of the gas will cease.

Having thus described our invention, what we claim, and desire to secure by Letters Patent of the United States, is—

1. In an apparatus for generating gas by the contact of a liquid with a solid material, the combination of an outer tank; a gas-holder within said tank; a liquid-reservoir within the center of said tank; an elevated reservoir on the outside of said tank; pipes leading from said elevated reservoir to the said reservoir within said tank; a valve in one of said pipes; means operated by the rising and falling of the gas-holder adapted to operate said valve; a receptacle for the gas-generating material carried in said gas-holder; a gas-chamber above said receptacle; passages leading to said gas-chamber; a pipe leading from said gas-chamber to the lower portion of the gas-holder; and an outlet-pipe from said gas-holder, substantially as described.

2. In an apparatus for generating gas by the contact of a liquid with a solid material, the combination of an outer tank; a gas-holder within said tank; a liquid-reservoir within the center of said tank; an elevated reservoir without said tank; pipes leading from said elevated reservoir to the reservoir within said tank; a valve in one of said pipes; an arm of said valve; a pivoted lever connected to said arm; devices mounted upon the gas-holder adapted to operate said pivoted lever so as to close said valve as the gas-holder rises and to open said valve as said gas-holder falls; a receptacle for the gas-generating material carried in said gas-holder; a gas-chamber above said receptacle; passages leading to said gas-chamber; a pipe leading from said gas-chamber to the lower portion of the gas-holder; and an outlet-pipe from said gas-holder, substantially as described.

3. In an apparatus for generating gas by the contact of a liquid with a solid material, the combination of an outer tank; a gas-holder within said tank; a liquid-reservoir within said tank; an elevated reservoir without said tank; pipes leading from said elevated reservoir to said reservoir within said tank; a valve in one of said pipes; means operated by the rising and falling of the gas-holder adapted to operate said valve; a receptacle for the gas-generating material carried in said gas-holder; feeding-pipes entering the top of said gas-holder; valves in said pipes; gas-chambers above said receptacle; passages connecting said chambers; a pipe leading from said gas-chamber to the lower portion of the gas-holder; and an outlet-pipe from said gas-holder, substantially as described.

4. In an apparatus for generating gas by the contact of a liquid with a solid material, the combination of an outer tank; a gas-holder within said tank; a liquid-reservoir entering the bottom of said tank; a pipe leading to said liquid-reservoir; a cylinder entering the head of said gas-holder and inclosing said reservoir; another cylinder extending into said reservoir; a head fitting over the tops of both of said cylinders, the inner cylinder having a closed bottom; a carbid-basket mounted upon the bottom of the inner cylinder; feed-pipes leading through said head and the bottom of said inner cylinder to said carbid-basket; valves in said pipes; a gas-chamber in the upper portion of said inner cylinder; pipes leading from above said carbid-basket thereto; an outlet from said gas-chamber to the outer cylinder; a pipe leading from said outer cylinder to the gas-holder; and an outlet-pipe from said gas-holder, substantially as described.

5. In an apparatus for generating gas by the contact of a liquid with a solid material, the combination of an outer tank; a gas-holder within said tank; a liquid-reservoir entering the bottom of said tank; a pipe leading to said liquid-reservoir; a cylinder entering the head of said gas-holder and inclosing said reservoir; a second cylinder extending into said reservoir and having a closed bottom; a head fixed to the top of said inner cylinder and resting upon the top of the outer cylinder; a screw connected to said head and adapted to raise and lower the same; a carbid-basket attached to the bottom of said inner cylinder; carbid-pipes entering the top of said inner cylinder and leading through the bottom thereof above said carbid-basket; a chamber in the bottom of said inner cylinder, and a chamber in the top of said cylinder; pipes connecting said chambers; an outlet from said upper chamber; a pipe leading from said outlet to the gas-holder; and an outlet-pipe from said gas-holder, substantially as described.

6. In an apparatus for generating gas by the contact of a liquid with a solid material, the combination of an outer tank; a gas-holder within said tank; a liquid-reservoir within said tank; an elevated reservoir without said tank; a pipe leading from said elevated reservoir to said reservoir within the tank; a valve in said pipe; devices operated by the rising and falling of the gas-holder adapted to control said valve; a cylinder fixed in the head of said gas-holder and inclosing said reservoir within said tank; a second cylinder extending into said reservoir; a common head for said cylinders, and means for securing the same in place; a carbid-basket mounted beneath said inner cylinder; carbid-pipes extending vertically through said inner cylinder to said carbid-basket; gas-chambers above said basket in said inner cylinder; a pipe leading from said chambers to the gas-holder; and an outlet-pipe for said gas-holder, substantially as described.

In testimony whereof we affix our signatures in presence of two witnesses.

JOHN MORTIMER RAYMOND.
LOUIS EDWARD LEMLEY.

Witnesses:
JOS. H. DeGRANGE,
JOHN J. SAUCIER.